US011720072B2

(12) United States Patent
Bertinetti et al.

(10) Patent No.: US 11,720,072 B2
(45) Date of Patent: Aug. 8, 2023

(54) PLANT STATE OPERATING ANALYSIS AND CONTROL

(71) Applicant: HONEYWELL INTERNATIONAL INC., Morris Plains, NJ (US)

(72) Inventors: Mark Bertinetti, East Killara (AU); Graeme Laycock, Hunters Hill (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 505 days.

(21) Appl. No.: 16/577,656

(22) Filed: Sep. 20, 2019

(65) Prior Publication Data
US 2020/0103838 A1    Apr. 2, 2020

Related U.S. Application Data

(60) Provisional application No. 62/738,870, filed on Sep. 28, 2018.

(51) Int. Cl.
*G05B 17/02* (2006.01)
*G05B 13/04* (2006.01)
(Continued)

(52) U.S. Cl.
CPC ........... *G05B 17/02* (2013.01); *G05B 13/048* (2013.01); *G06N 20/00* (2019.01);
(Continued)

(58) Field of Classification Search
CPC .................. G05B 17/02; G05B 13/048; G05B 2219/23273; G05B 2219/24055; G06Q 10/0639; G06N 20/00
(Continued)

(56) References Cited

U.S. PATENT DOCUMENTS 7,206,646 B2 *   4/2007   Nixon ................ G05B 23/0254
                                                              700/83
9,535,409 B1 *   1/2017   Cassity .................. F24S 20/20
                                                              700/287
(Continued)

OTHER PUBLICATIONS

K. Medjaher, D. A. Tobon-Mejia and N. Zerhouni, "Remaining Useful Life Estimation of Critical Components With Application to Bearings," in IEEE Transactions on Reliability, vol. 61, No. 2, pp. 292-302, Jun. 2012, doi: 10.1109/TR.2012.2194175 (Year: 2012).*

(Continued)

*Primary Examiner* — John E Johansen
(74) *Attorney, Agent, or Firm* — John Maldjian; Stevens & Lee PC (57) ABSTRACT

A system for analyzing operational data associated with a plant that has processing equipment configured and controlled to run a process involving at least one tangible material. Actual operational data corresponding to plant operations is received by a computing device that may relate to production, equipment, workforce, automation systems, safety, and/or cybersecurity of the plant. A model of the plant is generated based on the actual operational data, where the model indicates ideal plant operations including model operational data. The actual plant operational data and the model operational data are compared. Based on the operational data and the comparison of the operational data to model operational data, at least one recommendation for an action associated with the plant is determined.

16 Claims, 9 Drawing Sheets

(51) Int. Cl.
*G06Q 10/0639* (2023.01)
*G06N 20/00* (2019.01)

(52) U.S. Cl.
CPC ............. *G06Q 10/0639* (2013.01); *G05B 2219/23273* (2013.01); *G05B 2219/24055* (2013.01)

(58) Field of Classification Search
USPC .......................................................... 703/13
See application file for complete search history.

(56) References Cited

U.S. PATENT DOCUMENTS

| | | | | |
|---|---|---|---|---|
| 2007/0168057 A1* | 7/2007 | Blevins | ............... | G05B 13/022 700/53 |
| 2011/0093247 A1* | 4/2011 | Beauregard | ............ | G05B 17/02 703/2 |
| 2011/0106277 A1* | 5/2011 | Sayyar-Rodsari | ..... | G05B 13/04 700/30 |
| 2012/0010758 A1* | 1/2012 | Francino | ................ | G05B 17/02 700/291 |
| 2012/0283885 A1* | 11/2012 | Mannar | ................ | G05B 23/024 700/286 |
| 2012/0290104 A1* | 11/2012 | Holt | ....................... | G06Q 10/00 700/28 |
| 2014/0058534 A1* | 2/2014 | Tiwari | ................... | G05B 13/04 700/9 |
| 2014/0324739 A1* | 10/2014 | Claussen | .............. | G06K 9/6284 706/12 |
| 2015/0058090 A1* | 2/2015 | Pandey | .............. | G06Q 10/0637 705/7.36 |
| 2015/0199405 A1* | 7/2015 | Redlich | ................... | G06F 16/93 709/223 |
| 2016/0234239 A1 | 8/2016 | Knapp et al. | | |
| 2016/0258363 A1* | 9/2016 | Tiwari | ..................... | F02C 6/18 60/39.281 |
| 2016/0281607 A1* | 9/2016 | Asati | ....................... | F01K 13/00 700/1 |
| 2017/0091791 A1* | 3/2017 | Srinivasan | ............. | G06N 5/003 705/7.31 |
| 2017/0364043 A1* | 12/2017 | Ganti | ..................... | G05B 17/02 |
| 2018/0130260 A1* | 5/2018 | Schmirler | ............... | G06F 3/011 |
| 2018/0157247 A1* | 6/2018 | Hallihole | .............. | G05B 13/048 700/44 |
| 2018/0275690 A1* | 9/2018 | Lattanzio | ............... | B01J 8/1809 700/282 |

OTHER PUBLICATIONS

Extended European Search Report dated May 11, 2022, issued in connection with corresponding EP Application No. 19867426.9 (9 pages total).

* cited by examiner

PLANT STATE OPERATING ANALYSIS AND CONTROL

CROSS REFERENCE TO RELATED APPLICATIONS

This application claims the benefit of Provisional Application Ser. No. 62/738,870 entitled "MULTIDIMENSIONAL PLANT STATE OPERATING ANALYSIS," filed Sep. 28, 2018, which is herein incorporated by reference in its entirety.

FIELD

This Disclosure relates to managing the operation of a plant, such as a chemical plant or a petrochemical plant or a refinery, and more particularly to determining plant operations.

BACKGROUND

The performance of an industrial production process, such as refining hydrocarbons, is highly dependent on the proper functioning of a plant. Performance aspects of a plant, such as the performance of the production process itself, the performance of the processing equipment, the performance of the workforce, the performance of the automation system controlling production, the performance of safety systems and processes, and the state and performance of cybersecurity assets, general all significantly influence the efficiency of and, in turn, the profitability of the plant.

Managing performance aspects of a plant can be extremely difficult. While some tools may analyze and output information regarding limited aspects of plant performance, given the speed of change of, complexity of, and inter-relatedness of many plant performance variables, a complete understanding of plant performance is difficult to ascertain. This is particularly the case where different aspects of plant performance are often assigned to different individuals and computing devices, thereby introducing communications deficiencies. As such, determining ideal plant operating conditions as compared with current plant operating conditions as well as implementing strategies to improve the current plant operating conditions can both be particularly difficult to implement. "Ideal operating conditions" as used herein refers to operating conditions for the plant so that the plant is operating at its maximum potential (e.g., the highest efficiency or the highest product output quantity and/or quality) given the current circumstances, such as for oil refining the availability of processing equipment such as the Crude Oil Distillation Units (CDU's) and the grade of crude oil being processed. Ideal conditions are thus operating condition(s) a plant should be theoretically able to provide if everything in the plant is available and is working as theoretically possible, which should provide a plant output parameter(s) at its highest potential as compared to how the plant would actually be currently providing the output parameter(s).

SUMMARY

The following Summary presents a simplified summary of certain features. The Summary is not an extensive overview and is not intended to identify key or critical elements.

Disclosed aspects include methods, computing devices, and systems for aggregating and analyzing operational data associated with a plant. As used herein a "plant" includes processing equipment and field devices such as sensors and actuators that is configured to run an industrial process involving a tangible material or a power application that disclosed embodiments apply. For example, oil and gas, chemical, beverage, pharmaceutical, pulp and paper manufacturing, petroleum processes, electrical power, and water. A plant as used herein can thus also involve power plants including those that control renewable energy solutions such as solar and wind, that may also include associated batteries as power storage devices. A plant is distinct from a data processing system that only performs data manipulations.

Disclosed aspects include an analysis engine that solves the above-described unmet need for determining ideal plant operating conditions as compared with current plant operating conditions, and implementing strategies that improve current plant operating conditions. A disclosed analysis engine receives from at least one computing device associated with the plant, operational data corresponding to the plant. The operational data may relate to the performance of the production process, the performance of processing equipment, the performance of the workforce, the performance of the automation system controlling production, the performance of safety systems and processes, and the state and performance of cybersecurity assets, as well as other aspects of plant operations.

The operational data may be organized based on dimensions such as category (e.g., categories corresponding to process, processing equipment, people, control, and safety information), importance (e.g., significance of problem(s) indicated by the operational data), and confidence (e.g., how reliable the operational data is). Historical operational data (which is generally stored in a data historian) is used to generate a modeled plant, generally using software implemented on a computing device. The model of the plant may be used to determine whether the actual plant is currently operating what is termed "optimally". Operating optimally is distinct from operating "ideally", where "Ideally" implies perfection, as in the best production levels the plant could ever theoretically produce, vs "optimal" which considers practical constraints such of aging equipment, the grade of material being processed, the availability of processing equipment or other resources, so that optimal is the best that can be expected to be produced given the current real-world circumstances.

Model operational data from the model plant may be compared to the actual operational data that may be real-time data or historized data (real-time data is data streaming to the system live from the equipment, as opposed to historized data that is being collected over time and reviewed, analyzed retrospectively, and the differences are determined. Based on the actual operational data and/or differences between the model operational and actual operational data, at least one recommendation for plant improvement is determined which is then transmitted. For example, the recommendation may be to change an operating parameter in the plant such as a process temperature or a pressure that may be transmitted to the computing device implementing the analysis engine, to another computing device, or to an individual such as an operator or a technician. The recommendation may also request the operator or technician to make a suggested change to an operating parameter so that the recommendation is vetted by an individual before it is implemented. The recommendation may also request the operator or technician to go out in the field and perform a physical task or inspection of the equipment and to record observations about noise, vibration, or temperature, for example.

By way of a simplified example, a plant may provide, to a disclosed analysis engine, historical operational data comprising information about plant operations, such as the health of various reactors, the status of workers in the plant, and the like. The historical operational data may be used to determine a model of the plant implemented in software run by a computing device, and a model yield of product gas (e.g., an ideal yield of product gas under the circumstances resulting from the current operational data) may be determined. In one specific example the model operational data obtained from the model of the plant when compared to the actual operational data may indicate use of a higher burner temperature than the actual burner temperature indicated in the actual operating data received by the analysis engine. Differences between the model yield, the actual yield, the model burner temperature, and the actual burner temperature may be determined. Based on the actual burner temperature and the differences, a recommendation to increase the burner temperature may be implemented, such as by transmitting to a computing device coupled to an actuator controlling the burner, an instruction to increase the burner temperature.

Disclosed aspects include a system implementing disclosed plant state operating analysis and control comprising a computing device comprising a processor including an associated memory configured for implementing a method of plant state operating analysis and control. The method comprises receiving actual operational data associated with a plant originating from at least one device in the plant. Based on the actual operational data, at least one model of the plant is generated, wherein the model indicates ideal plant operations including model operational data. The actual operational data is compared to the model operational data. Based on the actual operational data and the comparing at least one recommendation is determined for actions associated with the plant. One example recommendation is to modify at least one operating parameter of the plant that can be implemented by triggering the sending of a control signal to an actuator that changes the operating parameter (e.g., a pressure or temperature in a particular processing system/asset).

BRIEF DESCRIPTION OF DRAWINGS

This Disclosure is illustrated by way of examples and is not limited in the accompanying figures in which like reference numerals indicate similar elements, which are not drawn to scale, and in which.

DETAILED DESCRIPTION

In the following description of various illustrative embodiments, reference is made to the accompanying drawings, which form a part hereof, and in which is shown, by way of illustration, various embodiments in which aspects of the Disclosure may be practiced. It is to be understood that other embodiments may be utilized, and structural and functional modifications may be made, without departing from the scope of this Disclosure.

It is noted that various connections between elements are discussed in the following detailed description. It is noted that these connections are general and, unless specified otherwise, may be direct or indirect, wired or wireless, and that the specification is not intended to be limiting in this respect.

Chemical Plants and Catalysts

As a general introduction, chemical plants, petrochemical plants, and/or refineries may include one or more pieces of processing equipment that process one or more input chemicals to create one or more products. For example, catalytic dehydrogenation can be used to convert paraffins to the corresponding olefin, e.g., propane to propene, or butane to butene. All or portions of the plant may be configured to monitor operational data of the plant. For example, one or more sensors may be installed on the plant to monitor a flow rate through a pipe, an amount of vibration, a temperature, or the like. Other devices may be configured to monitor plant output (e.g., the quantity and quantity of a product gas). Still other devices may be configured to monitor other plant operational data, such as the presence and actions taken by plant engineers, ambient conditions, the physical or computer security of computing devices at the plant, or the like.

References herein to plant "operators" are to be understood to refer to and/or include, without limitation, plant planners, managers, engineers, technicians, and others interested in, overseeing, and/or running the daily operations at a plant. FIG. 1A to FIG. 3 described below provide context to some example relatively complex industrial plants and processes that can be analyzed using disclosed concepts in order to provide actionable insights for the operator or other individual as to why the plant is not performing as it ideally should be operating to enable appropriate actions to be taken to improve the performance of the plant.

Figure 1A:
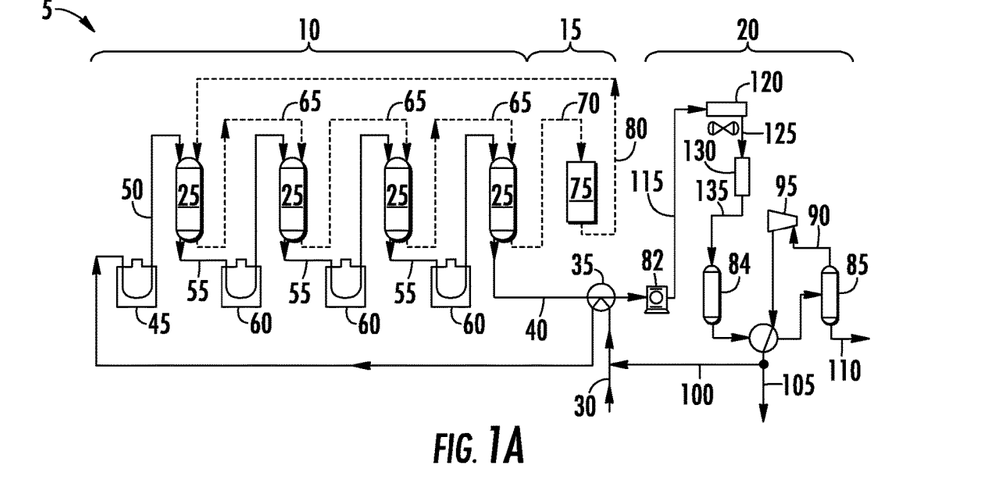
FIG. 1A shows an example system implementing a catalytic dehydrogenation process, in accordance with one or more example embodiments.

FIG. 1A shows an example system 5 implementing a catalytic dehydrogenation process. The system 5 includes a reactor section 10, a catalyst regeneration section 15, and a product recovery section 20.

The reactor section 10 includes one or more reactors 25. A hydrocarbon feed 30 is sent to a heat exchanger 35 where it exchanges heat with a reactor effluent 40 to raise the feed temperature. The feed 30 is sent to a preheater 45 where it is heated to the desired inlet temperature. The preheated feed 50 is sent from the preheater 45 to the first reactor 25. Because the dehydrogenation reaction is endothermic, the temperature of the effluent 55 from the first reactor 25 is less than the temperature of the preheated feed 50. The effluent 55 is sent to interstage heaters 60 to raise the temperature to the desired inlet temperature for the next reactor 25.

After the last reactor, the reactor effluent 40 is sent to the heat exchanger 35, and heat is exchanged with the feed 30. The reactor effluent 40 is then sent to the product recovery section 20. The catalyst 65 moves through the series of reactors 25. When the catalyst 70 leaves the last reactor 25, it is sent to the catalyst regeneration section 15. The catalyst regeneration section 15 includes a regenerator 75 where coke on the catalyst is burned off and the catalyst may go through a reconditioning step. A regenerated catalyst 80 is sent back to the first reactor 25.

The reactor effluent 40 is compressed in the compressor or centrifugal compressor 82. The compressed effluent 115 is introduced to a cooler 120, for instance a heat exchanger. The cooler 120 lowers the temperature of the compressed effluent. The cooled effluent 125 (cooled product stream) is then introduced into a chloride remover 130, such as a chloride scavenging guard bed. The chloride remover 130 includes an adsorbent, which adsorbs chlorides from the cooled effluent 125 and provides a treated effluent 135. Treated effluent 135 is introduced to a drier 84.

The dried effluent is separated in separator 85. Gas 90 is expanded in expander 95 and separated into a recycle hydrogen stream 100 and a net separator gas stream 105. A liquid stream 110, which includes the olefin product and unconverted paraffin, is sent for further processing, where the desired olefin product is recovered and the unconverted paraffin is recycled to the dehydrogenation reactor 25.

Figure 1B:
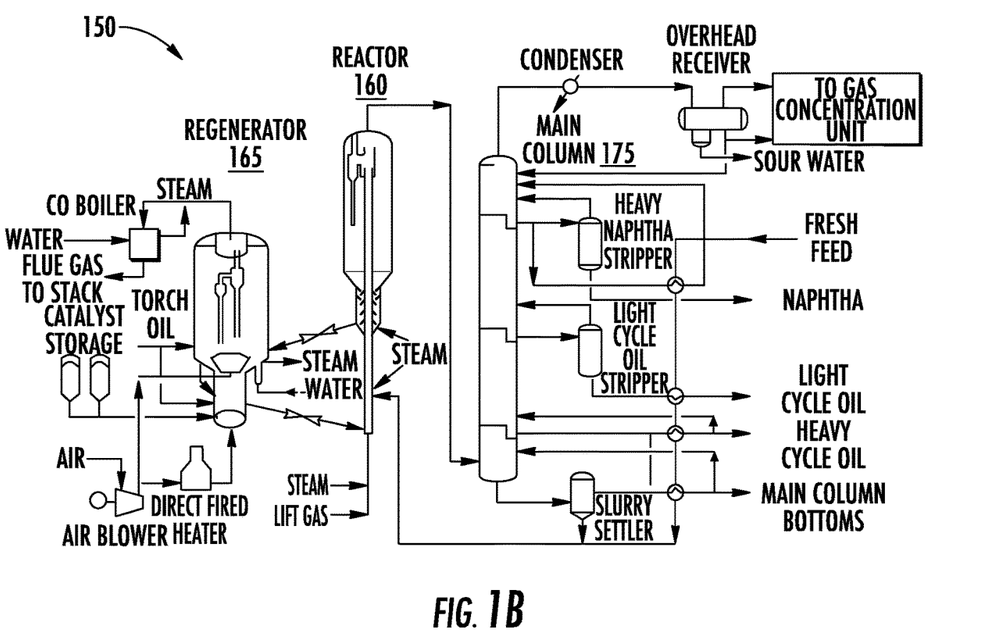
FIG. 1B shows an example system implementing a fluid catalytic cracking (FCC) process, in accordance with one or more example embodiments.

FIG. 1B shows an example FCC system 150 implementing an FCC process that includes an FCC fluidized bed reactor 160 and a spent catalyst regenerator 165. Regenerated cracking catalyst entering the FCC reactor 160 from the spent catalyst regenerator 165, is contacted with an FCC feed stream in a riser section at the bottom of the FCC reactor 160, to catalytically crack the FCC feed stream and provide a product gas stream, comprising cracked hydrocarbons having a reduced molecular weight on average, relative to the average molecular weight of feed hydrocarbons in the FCC feed stream. As shown in FIG. 1B, steam and lift gas are used as carrier gases that upwardly entrain the regenerated catalyst in the riser section, as it contacts the FCC feed. In this riser section, heat from the catalyst vaporizes the FCC feed stream, and contact between the catalyst and the FCC feed causes cracking of this feed to lower molecular weight hydrocarbons, as both the catalyst and feed are transferred up the riser and into the reactor vessel. A product gas stream comprising the cracked (e.g., lower molecular weight) hydrocarbons is separated from spent cracking catalyst at or near the top of the reactor vessel, preferably using internal solid/vapor separation equipment, such as cyclone separators. This product gas stream, essentially free of spent cracking catalyst, then exits the reactor vessel through a product outlet line for further transport to the downstream product recovery section.

The spent or coked catalyst, following its disengagement or separation from the product gas stream, requires regeneration for further use. This coked catalyst first falls into a dense bed stripping section of the FCC reactor 160, into which steam is injected, through a nozzle and distributor, to purge any residual hydrocarbon vapors that would be detrimental to the operation of the regenerator. After this purging or stripping operation, the coked catalyst is fed by gravity to the catalyst regenerator through a spent catalyst standpipe. FIG. 1B depicts a spent catalyst regenerator 165, which can also be referred to as a combustor. Regenerators may have various configurations. In the spent catalyst regenerator 165, a stream of oxygen-containing gas, such as air, is introduced to contact the coked catalyst, burn coke deposited thereon, and provide regenerated catalyst, having most or all of its initial coke content converted to combustion products, including $CO_2$, CO, and $H_2O$ vapors that exit in a flue gas stream. The regenerator 165 operates with catalyst and the oxygen-containing gas (e.g., air) flowing upwardly together in a combustor riser that is located within the catalyst regenerator. At or near the top of the regenerator 165, following combustion of the catalyst coke, regenerated cracking catalyst is separated from the flue gas using internal solid/vapor separation equipment (e.g., cyclones) to promote efficient disengagement between the solid and vapor phases.

In the FCC recovery section, the product gas stream exiting the FCC reactor 160 is fed to a bottoms section of an FCC main fractionation column 175 shown as a main column. Several product fractions may be separated on the basis of their relative volatilities and recovered from this main fractionation column. Representative product fractions include, for example, naphtha (or FCC gasoline), light cycle oil, and heavy cycle oil.

Other petrochemical processes produce desirable products, such as turbine fuel, diesel fuel and other products referred to as middle distillates, as well as lower boiling hydrocarbon liquids, such as naphtha and gasoline, by hydrocracking a hydrocarbon feedstock derived from crude oil or heavy fractions thereof. Feedstocks most often subjected to hydrocracking are the gas oils and heavy gas oils recovered from crude oil by distillation.

Figure 2:
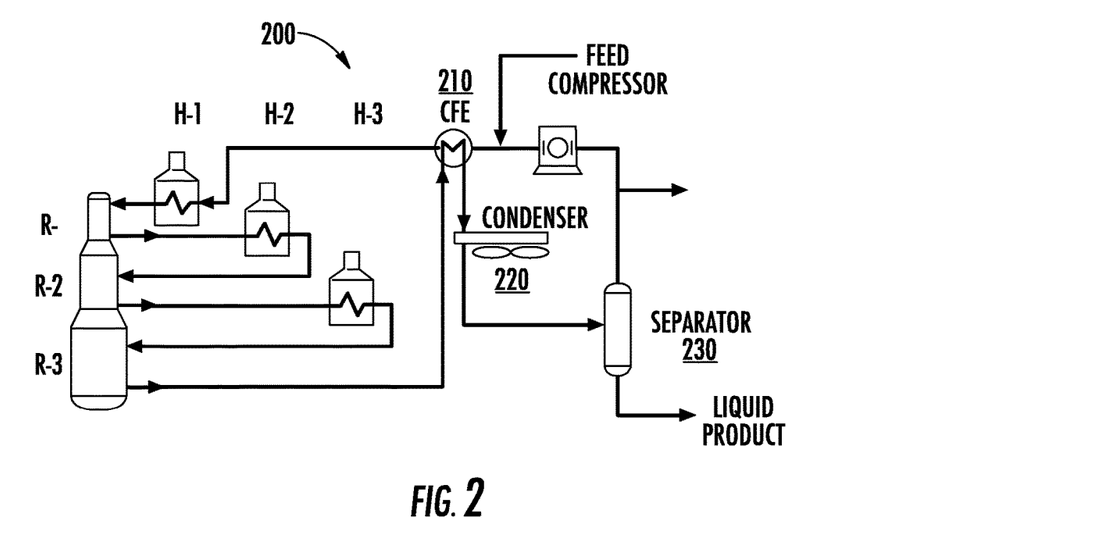
FIG. 2 depicts an example system for implementing a catalytic reforming process using a (vertically-oriented) combined feed-effluent (CFE) exchanger, in accordance with one or more example embodiments.

FIG. 2 shows an example system 200 implementing a process for reforming with continuous catalyst regeneration (CCR) using a vertically oriented CFE exchanger 210. The cold stream, a combination of liquid feed (110.4° C.) with hydrogen rich recycle gas (e.g., light paraffins) (125.8° C.) is introduced into a CFE exchanger 210 where the feed is vaporized. For example, an Entrance temperature: 96.9° C., and an Exit temperature: 499.6° C. The feed/recycle exits the CFE exchanger 210 as a gas and goes through a series of heating and reaction steps. The resulting product effluent or hot stream is introduced into the CFE exchanger 210 and is cooled down. (e.g., Entrance temperature: 527.9° C. Exit temperature: 109.1° C.). The effluent exits the CFE exchanger 210 and is then cooled down further and condensed using an air cooler 220. The liquid product is separated by a separator 230 from the gas stream containing hydrogen and light paraffins. Some of the gas stream is removed, for example as a product, and the rest of the stream is used as recycle gas.

Figure 3:
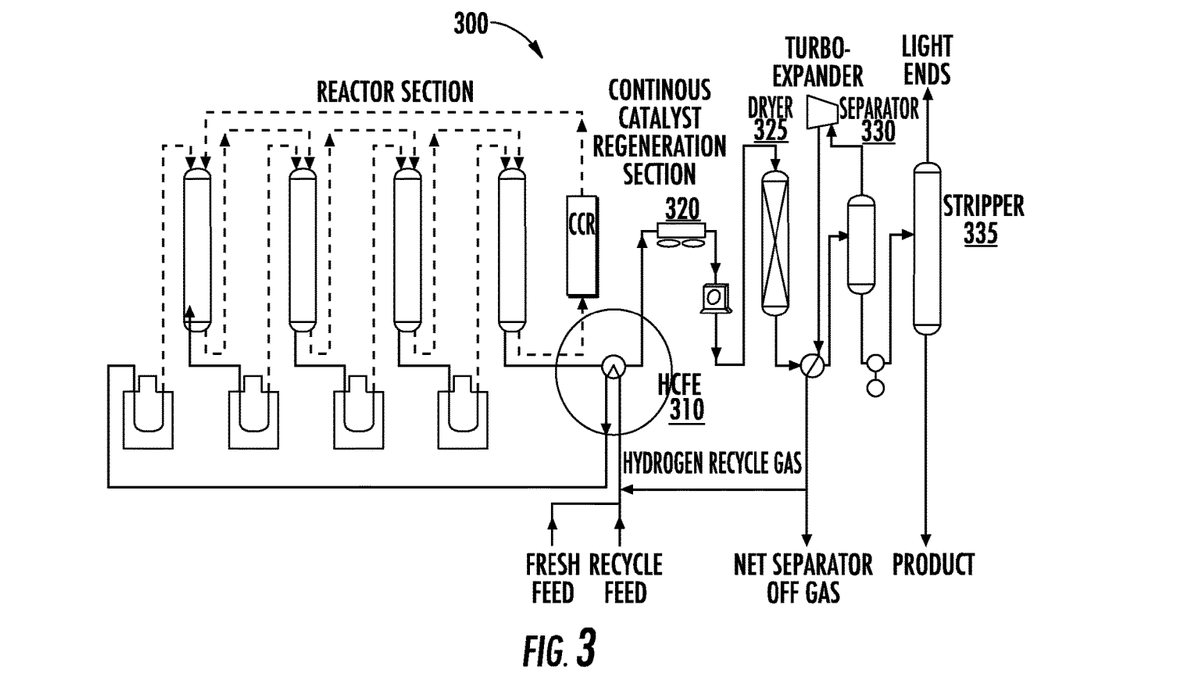
FIG. 3 depicts an example system for implementing a catalytic dehydrogenation process (e.g., OLEFLEX) with continuous catalyst regeneration (CCR) using a (vertically-oriented) hot combined feed-effluent (HCFE) exchanger, in accordance with one or more example embodiments.

FIG. 3 shows an example system 300 for implementing a catalytic dehydrogenation process (e.g., an OLEFLEX process) with continuous catalyst regeneration (CCR) using a vertically-oriented hot combined feed-effluent (HCFE) exchanger 310. The cold stream, a combination of vapor feed with hydrogen rich recycle gas, is introduced into a HCFE exchanger 310 and is heated. (e.g., Entrance temperature: 39.7° C.; Exit temperature: 533.7° C.) The feed/recycle exits the HCFE exchanger 310 as a gas and goes through a series of heating and reaction steps. The resulting product effluent or hot stream is introduced into the HCFE exchanger 310 and is cooled down. (e.g., Entrance temperature: 583.7° C.; Exit temperature: 142.3° C.) The effluent exits the HCFE exchanger 310 and is then cooled down further using an air cooler 320. The effluent then passes through a dryer 325, separators 330, and strippers 335. Hydrogen recycle gas is separated after the dryer 325 and returned to the feed stream.

Analysis of Plant Operating Data

Figure 4A:
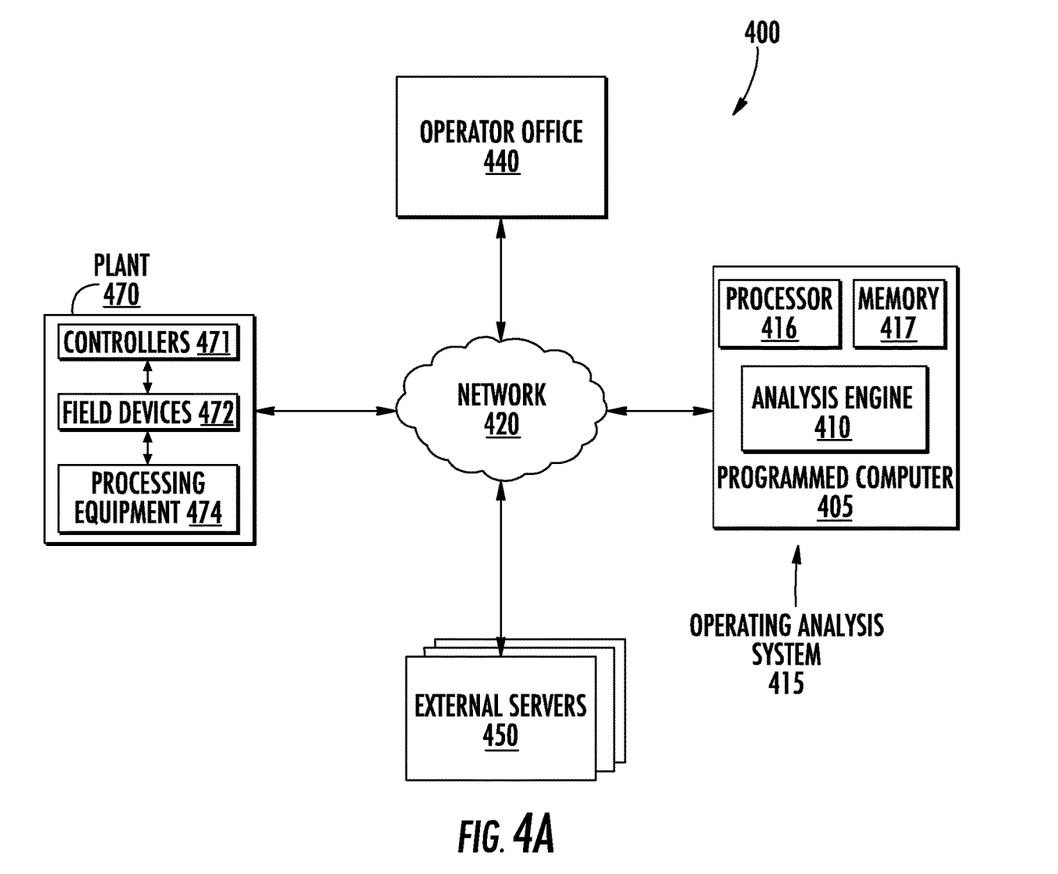
FIG. 4A shows an example network diagram of a system comprising a programmed computer including a computing device configured to implement a disclosed analysis engine.

FIG. 4A shows an example network diagram of a plant-based system 400 comprising a programmed computer 405 including an operating analysis system 415 comprising a processor 416 having associated memory 417 configured to implement a disclosed analysis engine 410. The analysis engine 410 may be connected, via a network 420, such as an ethernet network, to a plant 470 shown having controllers 471 coupled to field devices 472 (e.g., sensors and actuators) coupled to processing equipment 474, an operator office 440, and to external servers 450. The plant 470, is configured including controlled by one or more of the controllers 471 and field devices 472 coupled to the processing equipment 474 to perform the catalytic dehydrogenation process of FIG. 1A, the fluid catalytic cracking process shown implemented in FIG. 1B, or the processes shown implemented in FIGS. 2 and 3. Moreover, as noted above the plant 470 can also comprise a power generation plant or power generation system, that may include a power storage system such as comprising at least one battery. Though depicted as separate entities, the analysis engine 410, the plant 470, the operator office 440, and the external servers 450 may all be in the same location or in different locations.

The analysis engine 410 although shown having a single computing device, the operating analysis system 415 may comprise two or more computing devices, such as two or more servers (e.g., a cloud computing platform) configured to receive and analyze received actual operational data. The analysis engine 410 may be configured to receive over the network 420, from one or more sensors or platforms associated with the plant 470, actual operational data such as sensor measurements. The analysis engine 410 may be configured to process the received actual operational data, such as by performing error detecting routines, removing duplicate data points from the operational data, reconciling the operational data with a template or standard, and/or storing the received actual operational data. For example, the analysis engine 410 may be configured to convert all temperature measurements received into the temperature expressed in degrees Kelvin.

The analysis engine 410 may be configured to organize and otherwise categorize the actual operational data. Although the analysis engine 410 is depicted as a single element in FIG. 4A, the analysis engine 410 may be a distributed network of computing devices located in a plurality of different locations. The analysis engine 410 may comprise instructions stored in memory and executed by one or more processors. For example, the analysis engine 410 may be implemented as code and an executable file. As another example, the analysis engine 410 may comprise a computing device having one or more processors and memory devices storing instructions that, when executed by the one or more processors, performs one or more functions that are described herein.

The analysis engine 410 processes and analyzes the actual operational data. For example, the analysis engine 410 may be configured to execute code which compares the actual operational data received to threshold values and/or ranges. Machine-learning algorithms may be used to process and/or interpret the actual operational data. For example, the analysis engine 410 may store and use historical actual operational data received from a data historian (e.g., from the same or different plants) to teach machine-learning algorithm acceptable ranges for the actual operational data, and new actual operational data may be input into the machine-learning algorithm to determine if an undesirable plant condition(s) exists. Manual review by plant experts may be performed to process and/or interpret the actual operational data. For example, a certain range of actual operational data (e.g., unexpectedly high temperature values) may prompt manual review by an expert (e.g., a plant employee) using a computing device associated with the analysis engine 410.

The network 420 may be a public network, a private network, or a combination thereof that communicatively couples the analysis engine 410 to other devices in the plant 470. Communications between devices such as the computing devices of the plant 470 and the analysis engine 410, may be packetized or otherwise formatted in accordance generally with any appropriate communications protocol. For example, the network 420 may comprise a network configured to use Internet Protocol (IP). Communications may be encrypted as well.

The plant 470 may be any of various types of chemical and petrochemical manufacturing or refining facilities, or as noted above a power plant that may involve solar or wind derived power. The plant 470 may be configured with one or more computing devices that monitor plant operational data and report such operational data to the analysis engine 410. The plant 470 may comprise sensors that report actual operational data to the analysis engine 410 via the network 420. The plant 470 may additionally or alternatively conduct tests (e.g., lab tests), which may be sent as other actual operational data to the analysis engine 410. For example, operational data may relate to the pH or viscosity of liquids, the temperature of liquids, gases, or solids (e.g., the temperature of a burner or an inlet valve), the molecular consistency of a substance, the color of a substance, the amount of power used (e.g., by a machine), or the like. Such reporting of actual operational data may occur on a periodic basis (e.g., every ten seconds, every hour, for each plant cycle).

The operator office 440 may be configured to, via one or more computing devices of the operator office 440, receive and/or send actual operational data to the analysis engine 410, configure the plant 470, and/or communicate with and configure the analysis engine 410. Actual operational data may originate from both the plant 470 and the operator office 440. For example, actual operational data corresponding to workforce information may be transmitted from the operator office 440 to the analysis engine 410.

The external servers 450 may be configured to store actual operational data and/or information used to determine actual operational data. For example, the external servers 450 may store information relating to an average flow rate of a nozzle, which may be compared with an actual flow rate of a nozzle at the plant 470.

Figure 4B:
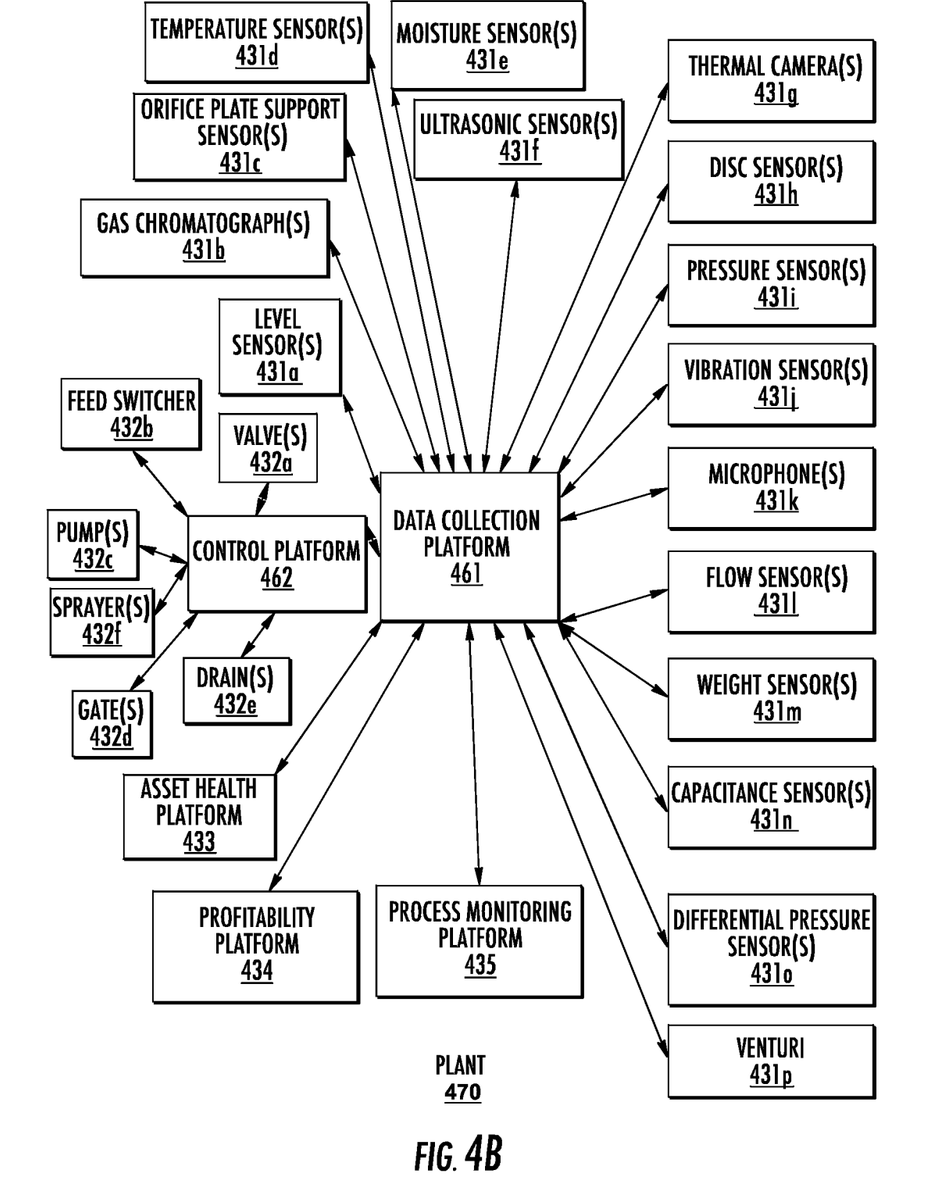
FIG. 4B shows an example plant with various operational data collecting platforms.

FIG. 4B shows an illustrative example of the plant 470 comprising a data collection platform 461 connected to a control platform 462, an asset (processing equipment) health platform 433, a profitability platform 434, and a process monitoring platform 435. The data collection platform 461 is connected to sensors 431*a-p* shown as various different types of sensors. The control platform 462 is connected to controllable devices 432*a-f*. The sensors 431*a-p* and controllable devices 432*a-f* depicted in FIG. 4B are examples, any number or type of sensors and/or controllable devices may be implemented, whether or not connected to the data collection platform 461 or the control platform 462. Although the sensors 431*a-p* and controllable devices 432*a-f* depicted in FIG. 4B are shown as connected to the data collection platform 461 and the control platform 462, other platforms, such as the asset (processing equipment) health platform 433 also shown in FIG. 4B, may receive actual operational data from the sensors 431a-p and/or controllable devices 432a-f.

The data collection platform 461 may be configured to collect actual operational data from one or more sensors and/or controllable devices and transmit that information, e.g., to the analysis engine 410. Such sensors may comprise, as shown for example, level sensors 431a, gas chromatographs 431b, orifice plate support sensors 431c, temperature sensors 431d, moisture sensors 431e, ultrasonic sensors 431f, thermal cameras 431g, disc sensors 431h, pressure sensors 431i, vibration sensors 431j, microphones 431k, flow sensors 431l, weight sensors 431m, capacitance sensors 431n, differential pressure sensors 431o, and/or venturi 431p. The data collection platform 461 may additionally or alternatively be communicatively coupled to the control platform 462 such that, for example, the data collection platform 461 may receive, from the control platform 462 and/or any of the controllable devices 432a-f, additional actual operational data corresponding to control of the plant 470. The controllable devices 432a-f may comprise, as shown for example, valves 432a, feed switchers 432b, pumps 432c, gates 432d, drains 432e, and/or sprayers 432f.

The asset health platform 433 may be configured to collect information about the health of various plant assets, such as equipment. For example, the asset health platform 433 may monitor wear and tear on a periodically replaced component in a plant, such as a nozzle. The asset health platform 433 may be connected to one or more sensors positioned to provide sensing for plant assets and/or may estimate asset health based on, for example, a depreciation schedule. The asset health platform 433 may be configured to receive, e.g., from the operator office 440, information about asset health. For example, an engineer may transmit, using a computing device, results of an equipment inspection to the asset health platform 433.

The process monitoring platform 435 may be configured to, based on information from one or more sensors 431a-p, determine actual operational data corresponding to processes (e.g., the chemical reactions required to produce a product gas) in the plant. For example, the process monitoring platform 435 may be configured to determine, based on other actual operational data, whether a catalyst should be replaced. As another example, the process monitoring platform 435 may be configured to determine that the actual production of the plant is less than a projected production of the plant.

The profitability platform 434 may be configured to monitor plant variables corresponding to business aspects of profit operation. For example, the profitability platform may be configured to determine, based on the cost of plant operations and plant yield, an estimated profit per hour. The profit may be represented as, e.g., a currency value. The profit may be estimated based on, for example, a market value of a product gas. Aspects of a plant may be represented in terms of their profit impact on plant operations. For example, a particular quantity of a catalyst may have an actual quantity (e.g., a quantity of kilograms) as well as a cost (e.g., a cost per kilogram used).

Figure 5:
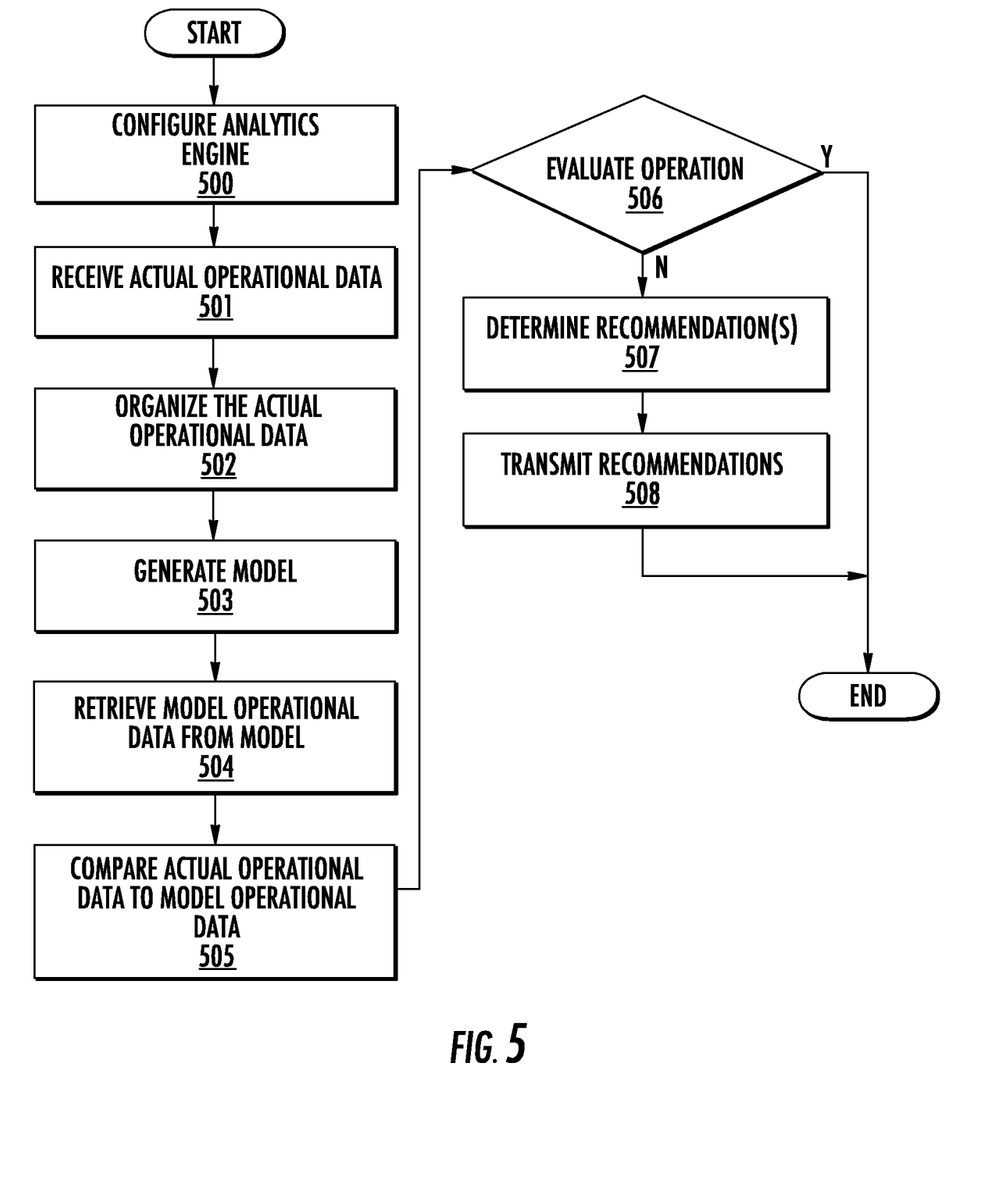
FIG. 5 is a flow chart showing a disclosed method of multi-dimensional plant state operating analysis and control which may be performed by a disclosed analysis engine.

FIG. 5 shows a flow chart for a method of plant state operating analysis and control that may be performed by a disclosed analysis engine implemented by a computing device. In step 500, the analysis engine may be configured. The analysis engine may be configured to collect actual operational data, e.g., at a predetermined rate or at predetermined times. The analysis engine may be configured with baseline measurements or values, such as default temperatures for a particular plant. The analysis engine may be configured with information and/or software making the analysis engine capable of simulating a plant. For example, the analysis engine may be provided physical characteristics of the plant, such as the location of the plant, a number of reactors, wind turbines or solar panels, at the plant, and the like. The analysis engine may be configured with one or more rules for organizing and/or interpreting the actual operational data. For example, the analysis engine may be configured to discard actual operational data that comes from sensors that are known to routinely malfunction.

In step 501 actual operational data is received associated with the plant originating from at least one device in the plant. The actual operational data generally includes historical data and real-time data, where the method may be performed by the computing device in real-time. Actual operational data may generally come from any source associated with the plant, such as the data collection platform 461, the control platform 462, the asset health platform 433, the profitability platform 434, and/or the process monitoring platform 435, and/or any of the sensors or devices depicted in FIG. 4B.

The actual operational data may also comprise one or more alerts or warnings. An alert and/or warning may correspond to one or more problems corresponding to the plant. For example, an alert may indicate that a burner is no longer working. As another example, a warning may indicate that a burner is receiving an unexpectedly low quantity of fuel, and that the heat of the burner is dropping. Operational data may comprise warnings or alerts that are related and/or inconsistent. For example, one alert may indicate that the temperature of a burner is dropping, whereas another alert may indicate that the temperature of a substance heated by the burner is increasing. An alert and/or warning may correspond to a projected problem being a problem that has not yet occurred but that may occur in the future. For example, if a temperature of a substance is increasing rapidly, the present temperature of the substance may be tolerable, but a projected temperature of the substance in ten minutes may be undesirable.

The actual operational data may comprise information that may indicate symptoms of the one or more alerts or warnings. For example, an alert may indicate that a burner is no longer active, and operational data may indicate whether fuel is being sent to the burner. As another example, operational data may comprise information indicating a reliability or importance of an alert and/or warning. For example, operational data may comprise diagnostic information for a sensor, such that a reliability of sensor measurements may be determined.

Actual operational data may comprise plant production information. Plant production information may comprise any information relating to the production of a product by the plant, e.g., through chemical processes. Plant production information may comprise a warning and/or alert indicating that product yield has dropped, that a catalyst should be replaced, or the like. Plant production information may relate to chemical and/or mechanical aspects of plant production.

Actual operational data may also comprise processing equipment health and/or status data. Asset health and/or status data may comprise any information corresponding to a plant's processing equipment, such as an amount of wear, depreciation, whether or not the processing equipment is in use, whether the processing equipment is being used in an unintended manner, or the like. Processing equipment health and/or status may comprise a warning and/or alert indicating that particular processing equipment is worn, broken, unreliable, or otherwise requiring maintenance. Processing equipment health and/or status may comprise an indication of an operating status of a particular piece of processing equipment, such as a flow rate of a nozzle, a heat of a burner, or an amount of vibration of a particular processing equipment. For example, processing equipment health and/or status may comprise a warning and/or alert that an amount of vibration of a particular piece oppressing equipment (e.g., a pipe) has exceeded a threshold.

Actual operational data may also comprise profitability information. Profitability information may comprise any information relating to profit of a plant, such as a dollar figure per hour, a ratio of costs versus the estimated value of product produced, or the like. For example, profitability information may comprise an indication of the cost of plant operations, including raw materials, as compared to the market value of a product gas. As another example, profitability information may comprise a warning and/or alert that profitability has dropped below a predetermined threshold.

Actual operational data may also comprise workforce information. Workforce information may comprise any information relating to human effort at the plant, including the presence or absence of employees, current work efforts by employees, or the like. For example, the workforce information may comprise a warning and/or alert that an engineer is not monitoring a particular aspect of a plant. Such a warning and/or alert may be automatically determined, for example, by comparing a task list for the engineer with a list of tasks marked or determined as completed. If the system determines that a task that was supposed to have been performed has not been completed (e.g., by determining that the task was not marked as completed, or by determining based on one or more measurements that the task was not completed), the system may determine that the engineer is not monitoring the particular aspect of the plant.

Actual operational data may also comprise automation system and/or control information. Automation system and/or control information may comprise any information about systems used to control and/or automate all or portions of a plant. For example, automation system and/or control information may comprise a warning and/or alert that a control system is no longer functioning or has input values which exceed a predetermined threshold.

Actual operational data may also comprise safety information. Safety information may comprise any information associated with the safe operation of a plant. For example, the safety information may comprise a warning and/or alert that occupational safety standards have been exceeded, that atmospheric conditions of a plant are unsafe for human presence (e.g., because a quantity of a particular substance (e.g., carbon monoxide in the air) exceeds a threshold), or the like.

Actual operational data may also comprise cybersecurity information. Cybersecurity information may comprise information associated with the security of devices, such as computing devices, associated with the plant. For example, cybersecurity information may comprise a warning and/or alert that software on a device (such as a patch) is out of date or insecure. The system may determine a version of the software on the device, connect to a server to determine a most current version of the software on the device, and compare the most current version to the version of the software on the device to determine whether the software on the device is out of date.

In step 502, the actual operational data may be organized. Operational data may be categorized into one or more categories. For example, the data may be categorized as relating to process performance, processing equipment performance, workforce performance, safety performance, control system performance, and cybersecurity performance. The actual operational data may be organized based on the device from which the organizational data was received. The actual operational data may be organized based on a confidence level associated with all or portions of the organizational data, such that relatively more reliable organizational data is separated from relatively less reliable organizational data. The actual operational data may be organized based on a time associated with all or portions of the data, such that relatively older data is separated from relatively newer actual operation data.

In step 503, based on the actual operational data, a model of the plant is generated, the model generation implemented generally in software. Generation of a model may comprise inputting, into software, parameters based on actual operating data (e.g., stored in a data historian and/or real-time operational data) to a computing device that generates a simulation of a plant. Multiple models of the plant may be generated to vary different operating parameters of the plant and test outcomes from the varied operating parameters.

The model of the plant may generate ideal operating conditions of the plant that includes model operational data (see step 504 described below). A model of a plant may be generated based on all or portions of the actual operational data. For example, a portion (e.g., a relatively reliable portion) of the actual operational data may be used to generate a model of a plant, with modeling software configured to generate an estimate of other operational data (model operational data). The model may estimate operating parameters for the plant in the form of model operational data, such as the same operating parameters of elements described above and with respect to FIGS. 1A-3.

Generation of the model may depend on the categorization of, importance values associated with, or confidence values associated with the actual operational data. For example, a model of the plant may be based on certain categories of the operational data, or a model of the plant may be based only on portions of operational data associated with an importance relating to importance to an operation of plant and/or confidence value relating to reliability of the actual operational data that exceeds a threshold.

The model may be used to project ideal or target operating conditions. For example, actual operational data may suggest that a plant is operating sub-optimally, and the model may be used to determine ideal plant operating conditions, and, if desired, what ideal operational data comprises. As such, the model may, but need not, reflect a version of the plant that is operating optimally, e.g., as constrained by all or portions of the operational data provided.

The model may be based on a machine-learning algorithm. A machine-learning algorithm may be trained using actual operational data, e.g., from the same or different plants. For example, a machine-learning algorithm may be trained by providing the machine-learning algorithm different sets of operational data along with feedback on whether all or portions of the provided operational data are within or outside expected ranges. The machine-learning algorithm may thereby be trained to, based on operational data, provide output indicating, for example, whether all or portions of the input operational data are outside expected boundaries. The machine-learning algorithm may be used to determine, for example, optimal plant operation, whether all or portions of the plant are operating sub-optimally, whether all or portions of the actual operating data are within predicted ranges, or the like.

The model may be based on actual historical plant operational data that is generally stored in a data historian. Actual operational data may be stored over time, such as over periods of months or years. This stored history of operational data may be used to train the model as well as to determine differences between present and historical plant operational data. For example, an instant temperature reading may appear permissible; however, a trend of temperature readings may suggest that the temperature of a burner is undesirably falling rapidly.

In step 504, the model provides ideal plant operations including model operational data. The model operational data (e.g., simulated temperatures, or simulated flow rates) may be the same or different than the actual operational data used to generate the model. For example, internally inconsistent actual operational data may be provided to the model, and the model may generate model operational data that is consistent by ignoring or modifying all or portions of the actual operational data. As another example, the actual operational data used to generate the model may comprise an indication that an operating burner is below freezing, but the model operational data may ignore this indication and generate a temperature reading that is consistent with operation of the burner.

In step 505, the actual operational data and the model operational data is (are) compared to determine their differences. As indicated above, all or portions of the model operational data may differ from all or portions of the actual operational data. One reason the model operational data may differ from all or portions of the actual operational data is that the model operational data may correspond to ideal operation of the plant. One or more differences between the actual operational data and the model operational data may be determined. For example, actual flow rates and model flow rates may differ. The difference between the actual operational data and the model operational data may be quantified as, for example, a percentage. For example, the actual yield rate may be ninety percent of the model yield rate (e.g., the ideal yield rate given constraints suggested by operational data provided the model).

In step 506, an evaluation is made as to whether or not the plant is operating at what is deemed to be an optimal level. Determining whether the plant is operating optimally may be based on the actual operational data and/or comparing to determine differences between the actual operational data and the model operational data, where the difference can be compared to a threshold. The differences between the actual operational data and the model operational data may be minimal and thus may be within a threshold. For example, the difference between a temperature in the actual operational data and a corresponding temperature in the model operational data may be less than 1 degree centigrade, suggesting that the difference may be inconsequential or related to rounding. As such, even though the performance of a model plant and actual plant may differ slightly, both may be sufficiently similar to conclude that the actual plant is operating near-optimally.

The differences between the actual operational data and the model operational data may exceed the threshold, suggesting that the plant may be operating sub-optimally. For example, the difference between a flow rate in the operational data of a plant and a corresponding flow rate in the model operational data may be large enough to be deemed to be significant, suggesting that the plant may be performing poorly. The threshold may be specific to measurements, such that, for example, a 1% difference in temperatures may be within the threshold, whereas a 1% difference in flow rate may exceed the threshold. If the plant is not operating optimally, the flow chart proceeds to step 507. Otherwise, the method ends.

In step 507, based on the actual operational data and the differences between the model operational data and the actual operational data found in the comparing at least one recommendation for an action (or task) associated with the plant may be made. A recommended action to be taken, for example may be to modify one or more operating parameters of the plant. For example, based on determining that a computing device in the plant has an old operating system, one recommendation may be to upgrade the operating system. A recommendation may indicate that further investigation should be performed. For example, the actual operational data may be insufficient to determine whether yield can be improved, and a recommendation may comprise an indication that more sensors should be installed at a particular portion of the plant. Recommendations may additionally and/or alternatively comprise an indication to add or remove portions of a plant, to change personnel assignments, to perform cybersecurity evaluations, to perform safety training, or the like.

Recommended actions may be based on the model of the plant. For example, if multiple models of a plant are determined to test different permutations of operating parameters, differences between the operating parameters of the model with the best performance and current actual operating parameters may be determined and, based on these differences, actions which may be taken to remove or reduce these differences may be determined. As a simple example, if a best case model suggests that yield may be improved by increasing fuel flow to a burner, then recommendations may include a recommendation to increase the fuel flow to a burner.

In step 508, the recommendation(s) is transmitted to the computing device implementing the method of plant state operating analysis and control, to another computing device, or to an individual, and one of these computing devices or the individual participating in an action(s) implement the recommendation(s). For example, the recommendations may be transmitted to a computing device having a display for displaying the recommendations, such as on a user interface coupled to the computing device. Plant operators may view such an interface, e.g., in the operator office 440, to evaluate the difference between actual operational data and the ideal plant operational data. Additionally, or alternatively, one or more instructions may be transmitted to devices (e.g., control devices) associated with the plant in order to modify plant operations. For example, based on determining that a burner temperature should be increased, an instruction to increase fuel flow rate to a burner may be transmitted to the plant 470.

As noted above recommendations may be output to particular computing devices or individuals associated with the plant. For example, a recommendation to modify a burner temperature may be transmitted to a computing device coupled to an actuator configured to modify the burner temperature and/or to plant personnel tasked with maintaining burners.

The plant generally includes a plurality of assets including processing equipment configured together and controlled to run a process involving a tangible material that provides at least one function (e.g., generates a physical product, such as a particular chemical or chemical mixture, or electrical power), and the plant may utilize a plurality of operating parameters for monitoring the process. Each of the processing equipment and the operating parameters may comprise fault or failure modes which each may have associated recommendation(s) for an action for dealing with the fault or failure mode. The method may comprise selecting an underperforming processing equipment from the plurality of processing equipment or an underperforming operating parameter from a plurality of operating parameters. This selecting may filter the processing equipment or operating parameters to only those associated with the underperforming processing equipment or operating parameter(s) selected, which in turn will filter the recommendation(s) to only those related to both the underperforming operating equipment or underperforming operating parameter. For example, selecting a particular underperforming process equipment can filter the list of operating parameters to only the operating parameter(s) that this underperforming processing equipment is affecting, and filter the list of recommendations to display only the recommendations related to both the selected processing equipment and its related operating parameters and highlight their associated fault or failure modes, so that the operator can more quickly identify the fault or failure mode that needs to be addressed and know action(s) to resolve the specific current fault or failure mode.

Figure 6:
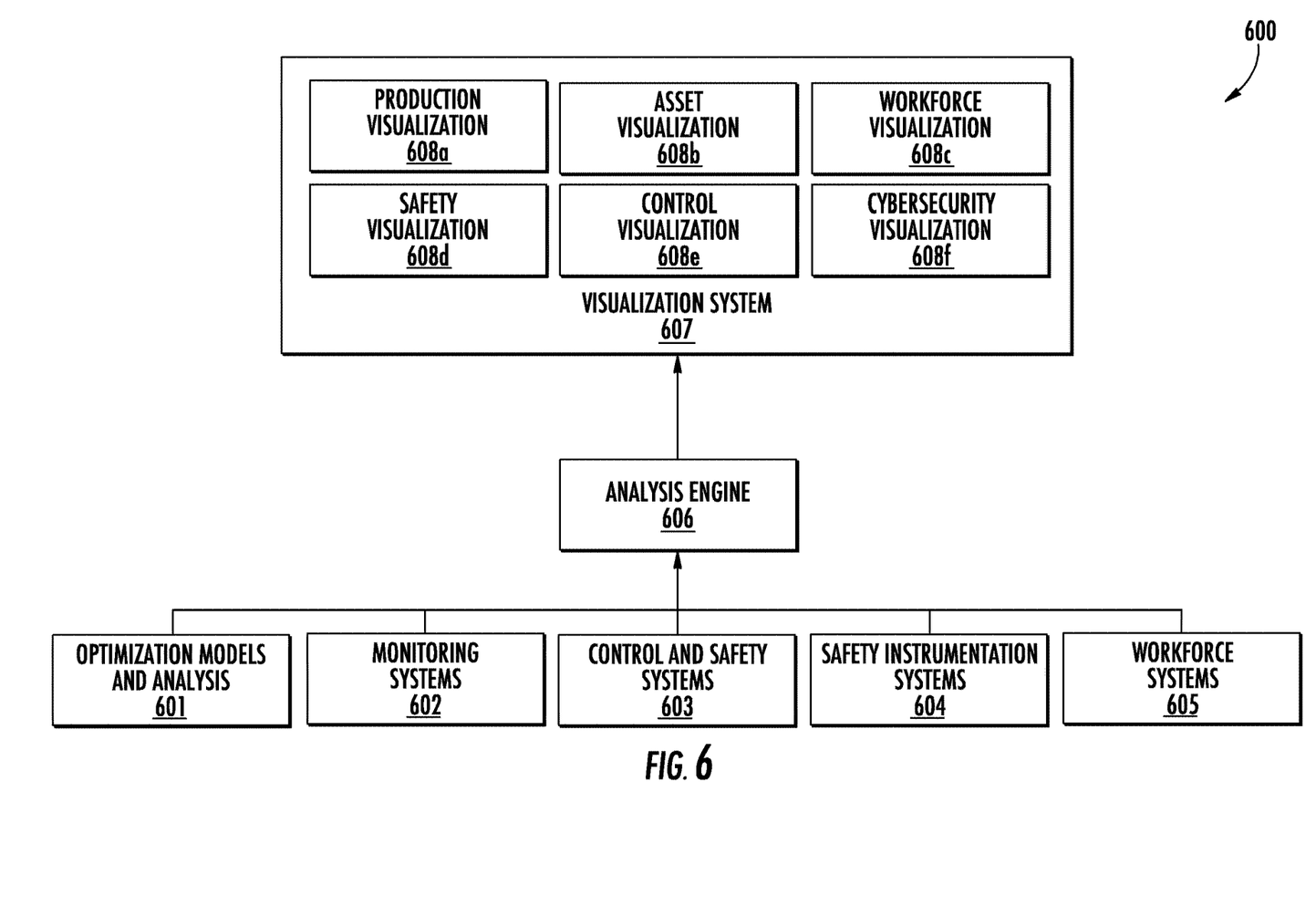
FIG. 6 is an example of a disclosed data flow involving a disclosed analysis engine showing various operational data may be collected by an analysis engine.

FIG. 6 is an illustrative example of data flow 600 involving a disclosed analysis engine. Various operational data may be collected by an analysis engine 606. As shown in FIG. 6, the operational data may comprise model operational data from optimization models and analysis 601 and the actual operational data received from monitoring systems 602, control and safety systems 603, safety instrumentation systems 604, and/or workforce systems 605. The actual operational data received may be received from the sensors and/or devices described with respect to FIG. 4B. For example, the monitoring systems 602, the control and safety systems 603, the safety instrumentation systems 604, and/or the workforce systems 605 may be the same or similar devices and/or sensors as those described in FIG. 4B.

Though the optimization models and analysis 601 are described as information received by the analysis engine 606, the optimization models and analysis may be stored and/or generated by the analysis engine 606 itself. The analysis engine 606 may be the same or a similar device as the analysis engine 410. The analysis engine 606 may, during or after the steps described regarding FIG. 5, cause operational data and/or one or more recommendations to be sent to a visualization system 607.

The visualization system 607 may be configured to display different aspects of the operational data and/or recommendations. For example, the visualization system 607 may comprise a production visualization 608a, an asset (processing equipment) visualization 608b, a workforce visualization 608c, a safety visualization 608d, a control visualization 608e, and/or a cybersecurity visualization 608f. Such visualizations may be based on, for example, categories of operational data determined by the analysis engine.

Figure 7A:
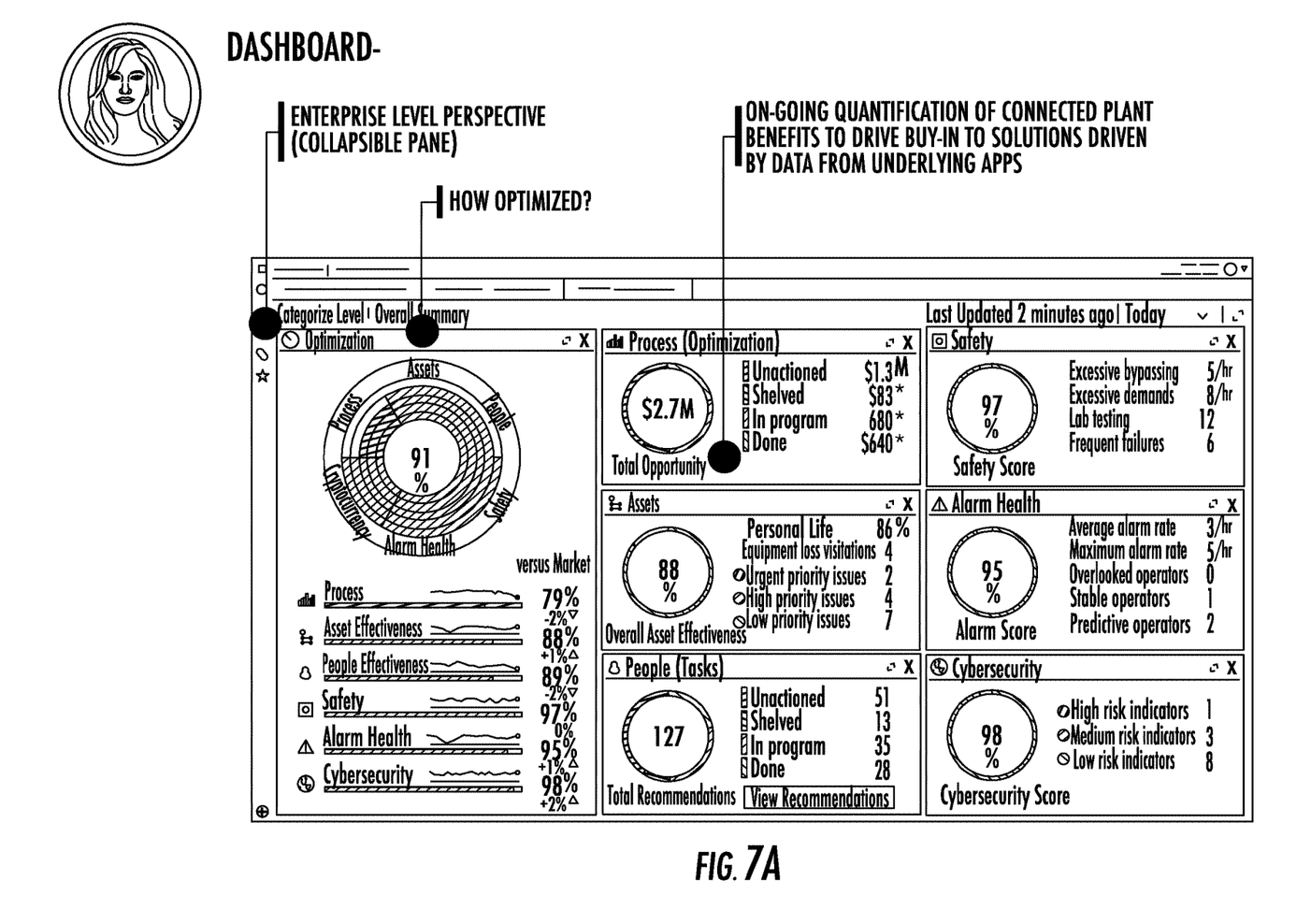
FIGS. 7A and 7B are two illustrative examples of user interfaces which may be generated by a disclosed visualization system.
Figure 7B:
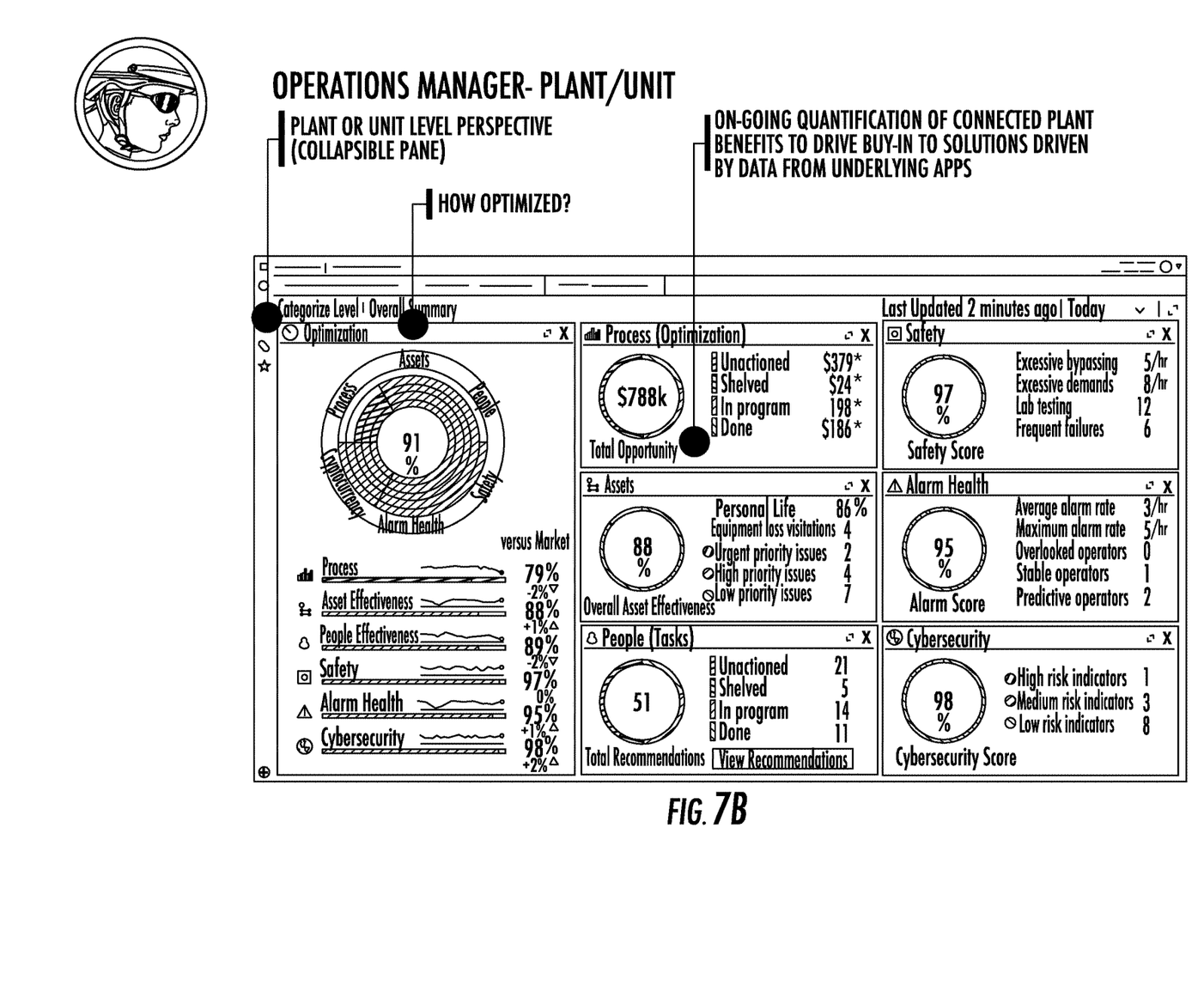

FIGS. 7A and 7B are two illustrative examples of user interfaces which may be generated by the visualization system 607. FIG. 7A shows a user interface which may be presented to high-level plant personnel. The interface depicted comprises categories (e.g., process, assets such as processing equipment, people, safety, processing equipment health, and cybersecurity) at a high level, showing aggregate information corresponding to operational data. FIG. 7B shows a user interface which may be presented to plant-level personnel. The interface depicted comprises the same categories as FIG. 7A, but with greater detail. The visualized information may be specific to recommendations which may be relevant to the user of the visualization. For example, the interface in FIG. 7A may display recommendations which may be acted upon by high-level plant personnel, whereas the interface in FIG. 7B may display recommendations which may be acted upon by plant-level personnel.

Figure 7C:
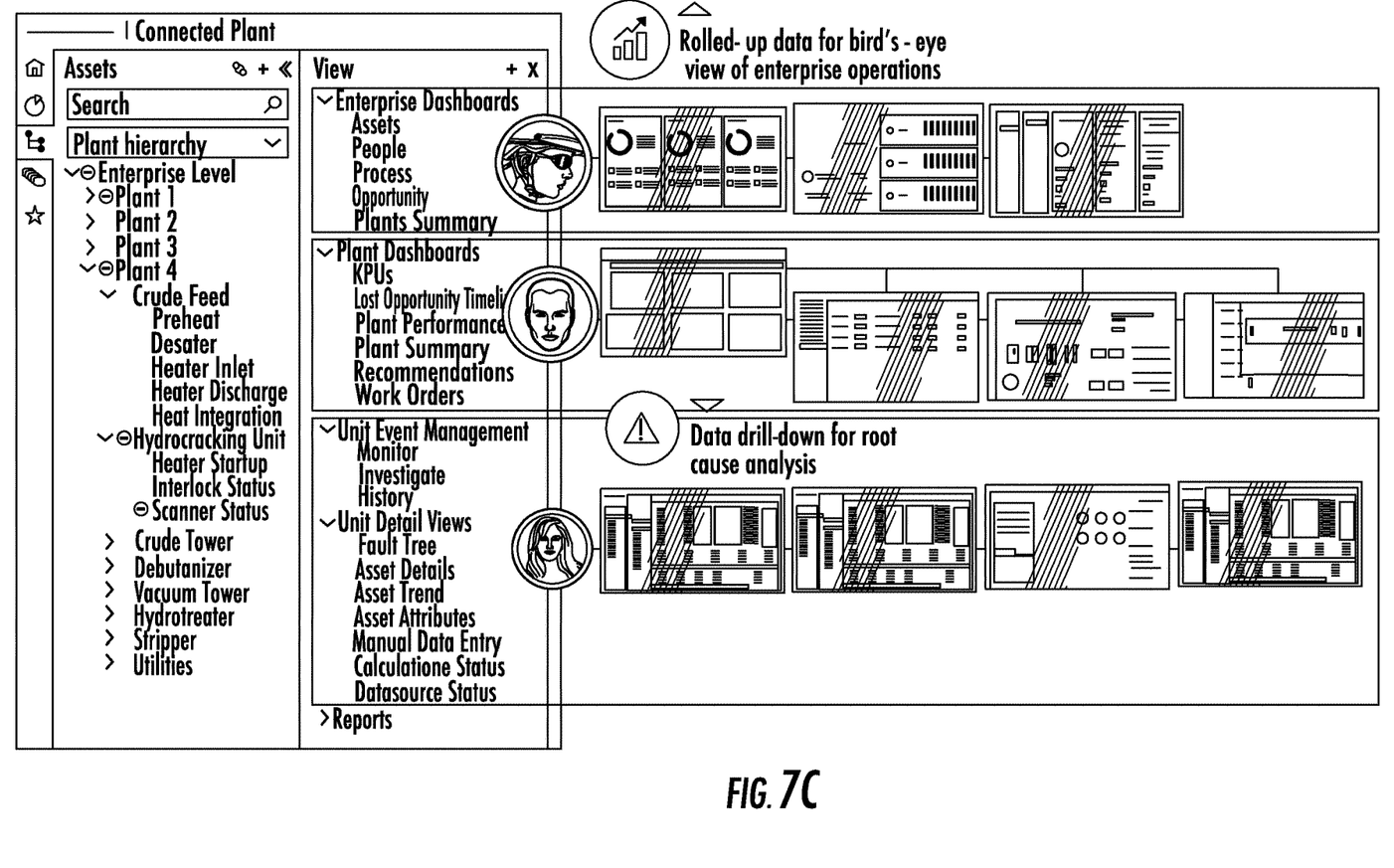
FIG. 7C is an example of how the user interfaces depicted in FIG. 7A and FIG. 7B may operate.

FIG. 7C is an illustrative example of how the user interfaces depicted in FIG. 7A and FIG. 7B may operate. As shown in FIG. 7C, users of the user interface generated by the visualization system 607 may evaluate operational data and/or recommendations in the aggregate or with more specificity. In turn, users may be provided different levels of detail based on their relationship to the plant. For example, as depicted by the horizontal categories of FIG. 7C, high-level personnel may be initially provided operational data and/or recommendations in the aggregate, whereas plant-level personnel may be initially provided operational data and/or recommendations with finer detail.

Aspects of the Disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the Disclosure.

The invention claimed is:

1. A method of managing the operation of a plant in a plant state operating analysis and control system, comprising:
   receiving actual operational data using a first computing device associated with the plant that has processing equipment configured and controlled to run a process involving at least one tangible material or a power application originating from at least one device in the plant;
   generating based on the actual operational data at least one model of the plant using categorization, importance value and confidence value relating to reliability associated with the actual operation data that exceeds a threshold, wherein the model provides ideal plant operations including model operational data,
   wherein the categorization includes categories corresponding to process, processing equipment, people, control, and safety information, wherein the importance value corresponds to significance of problem indicated by the actual operational data, and the confidence value corresponds confidence level associated with all or portions of the organizational data, such that relatively more reliable organizational data is separated from relatively less reliable organizational data;
   comparing the actual operational data and the model operational data,
   determining based on the actual operational data and the comparing, at least one recommendation for an action associated with the plant; and
   transmitting the at least one recommendation to at least one of the first computing device, a second computing device, and an operator implementing the action.

2. The method of claim 1, wherein the actual operational data is real-time data, and wherein the method is performed by the first computing device in real-time.

3. The method of claim 1, wherein the actual operational data includes historical operational data for the plant.

4. The method of claim 1, wherein the actual operational data comprises at least one of information regarding profit or loss of the plant, the processing equipment, workforce performance, automation system performance, safety system performance, and cybersecurity performance.

5. The method of claim 1, wherein the recommendation is determined from the actual operational data that collectively includes 2 or more different parameters of the process, 2 or more issues associated with the process, or 2 or more issues associated with the processing equipment.

6. The method of claim 5, wherein the recommendation comprises a plurality of recommendations, further comprising selecting first equipment from the processing equipment that is underperforming, and selecting for the first equipment first data from the actual operational data, and then linking together the first equipment and the first data to filter the plurality of recommendations to only those related to both the first equipment and the first data.

7. The method of claim 1, wherein the model is based on a machine-learning algorithm.

8. The method of claim 1, wherein the plant is involved in oil, gas, chemical, beverage, pharmaceutical, pulp and paper manufacturing, petroleum processes, electrical power, or water.

9. A plant state operating analysis and control system, comprising:
a computing device comprising a processor including an associated memory for realizing an analysis engine that is configured for implementing a method of plant state operating analysis and control, the plant state operating analysis and control system configured to:
receive actual operational data using the first computing device, associated with the plant that has processing equipment configured and controlled to run a process involving at least one tangible material or power application originating from at least one device in the plant;
generate based on the actual operational data, at least one model of the plant using categorization, importance value and confidence value relating to reliability associated with the actual operation data that exceeds a threshold, wherein the model indicates ideal plant operations including model operational data,
wherein the categorization includes categories corresponding to process, processing equipment, people, control, and safety information, wherein the importance value corresponds to significance of problem indicated by the actual operational data, and the confidence value corresponds confidence level associated with all or portions of the organizational data, such that relatively more reliable organizational data is separated from relatively less reliable organizational data;
compare the actual operational data and the model operational data,
determine based on the actual operational data and the comparing at least one recommendation for actions associated with the plant; and
transmit the at least one recommendation to at least one of the first computing device, a second computing device, and an operator implementing the action.

10. The system of claim 9, wherein the actual operational data is real-time data, and wherein the method is performed by the computing device in real-time.

11. The system of claim 9, wherein the actual operational data includes historical operational data for the plant.

12. The system of claim 9, wherein the actual operational data comprises at least one of information regarding profit or loss of the plant, the processing equipment, workforce performance, automation system performance, safety system performance, and cybersecurity performance.

13. The system of claim 9, wherein the recommendation is determined from the actual operational data that collectively includes 2 or more different parameters of the process, 2 or more issues associated with the process, or 2 or more issues associated with the processing equipment.

14. The system of claim 13, wherein the recommendation comprises a plurality of recommendations, wherein the method further comprises responsive to a user selecting first equipment from the processing equipment that is underperforming, and selecting for the first equipment first data from the actual operational data, linking together the first equipment and the first data to filter the plurality of recommendations to only those related to both the first equipment and the first data.

15. The system of claim 9, wherein the model is based on a machine-learning algorithm.

16. The system of claim 9, wherein the plant is involved in oil, gas, chemical, beverage, pharmaceutical, pulp and paper manufacturing, petroleum processes, electrical power, or water.

* * * * *